United States Patent [19]

Eckel

[11] E Patent Number: Re. 31,699

[45] Reissued Date of Patent: Oct. 9, 1984

[54] BACK-UP POWER TONGS AND METHOD

[75] Inventor: Emery L. Eckel, Odessa, Tex.

[73] Assignee: Eckel Manufacturing Company, Inc., Odessa, Tex.

[21] Appl. No.: 493,976

[22] Filed: May 12, 1983

Related U.S. Patent Documents

Reissue of:

[64] Patent No.: 4,290,304
Issued: Sep. 22, 1981
Appl. No.: 34,774
Filed: Apr. 30, 1979

[51] Int. Cl.[3] ..... B25B 17/00

[52] U.S. Cl. ..... 73/862.25; 81/57.18

[58] Field of Search ..... 73/862.25; 81/54, 56, 81/57.15, 57.16, 57.18, 57.19, 57.2, 57.21, 57.24, 57.34, 57.35, 57.44

[56] References Cited

U.S. PATENT DOCUMENTS

| | | | |
|---|---|---|---|
| 2,544,639 | 3/1951 | Calhoun | 81/57.19 X |
| 2,639,894 | 5/1953 | Smith | 81/56 X |
| 2,668,689 | 2/1954 | Cormany | 81/56 X |
| 2,871,743 | 2/1959 | Kelly | 81/57.2 X |
| 3,086,413 | 4/1963 | Mason | 81/56 X |
| 3,371,562 | 3/1968 | Kelley | 81/57.18 |
| 3,380,323 | 4/1968 | Campbell | 81/57.34 X |
| 3,507,174 | 4/1970 | Dickmann | 81/57.18 |
| 3,518,903 | 7/1970 | Ham et al. | 81/57.16 |
| 3,548,692 | 12/1970 | Dickmann | 81/57.18 |
| 4,005,621 | 2/1977 | Turner, Jr. et al. | 81/57.2 |
| 4,084,429 | 4/1978 | Boland | 81/57.16 X |
| 4,084,453 | 4/1978 | Eckel | 81/57.18 |

FOREIGN PATENT DOCUMENTS

| | | |
|---|---|---|
| 1215967 | 12/1970 | United Kingdom . |
| 1348954 | 3/1974 | United Kingdom . |

*Primary Examiner*—Charles A. Ruehl
*Attorney, Agent, or Firm*—Carwell & Helmreich

[57] ABSTRACT

A back-up tong for use with a power tong holds the lower pipe in a pipe joint from being rotated, so as to effect makeup or breakout of the pipe joint. The backup tong employs sliding heads which are driven by camming surfaces on a ring-like member fixedly positioned about the pipe, when the heads are arcuately rotated about the pipe. The assembly holding the heads is arranged to be released automatically from the bottom of the back-up tong frame, in the event that the drill string begins to slip back down into the hole, or in the event a portion of the string is prematurely lifted, thereby preventing damage to the back-up tong. The back-up tong is constructed so that only a minimum amount of clearance is required at the top working surface, thereby permitting the sliding heads to be located as near the joint as possible when simultaneously using a power tong.

15 Claims, 10 Drawing Figures

FIG. 5
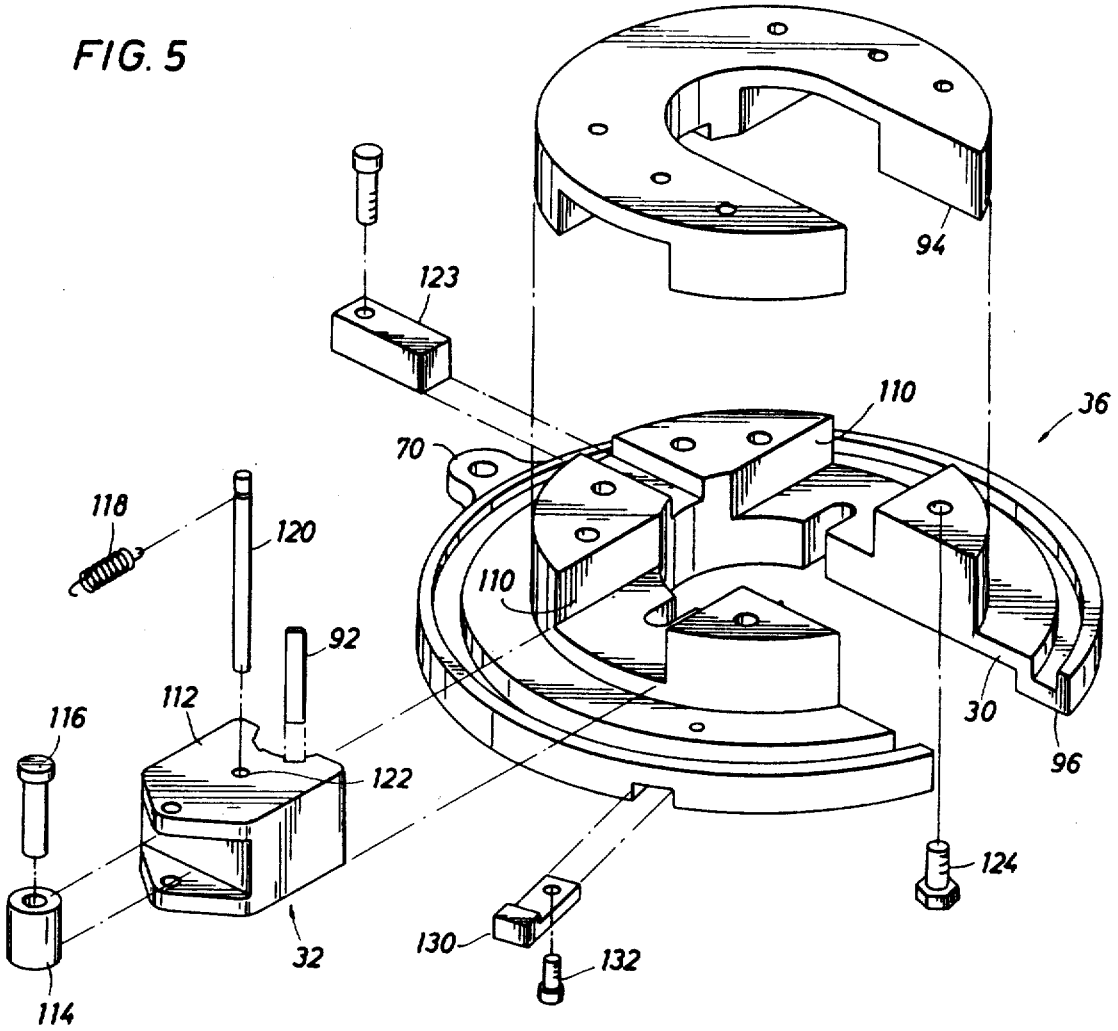
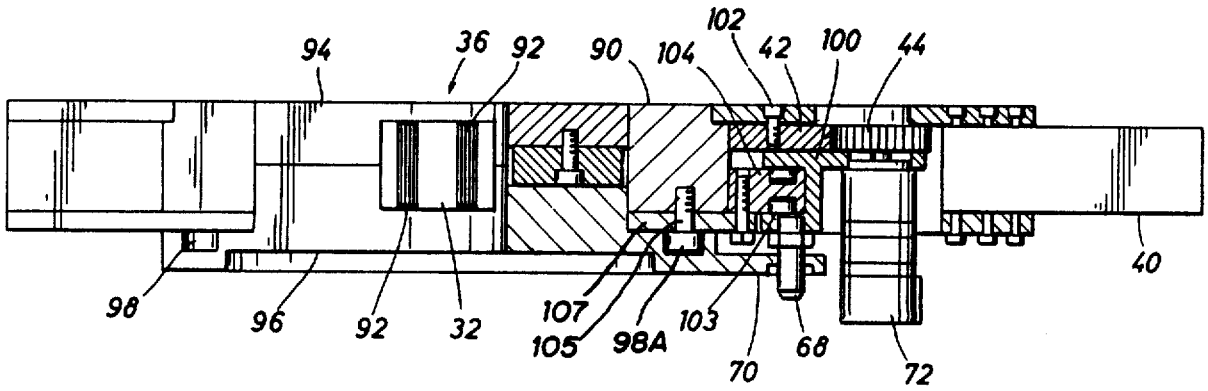
FIG. 4

FIG. 6
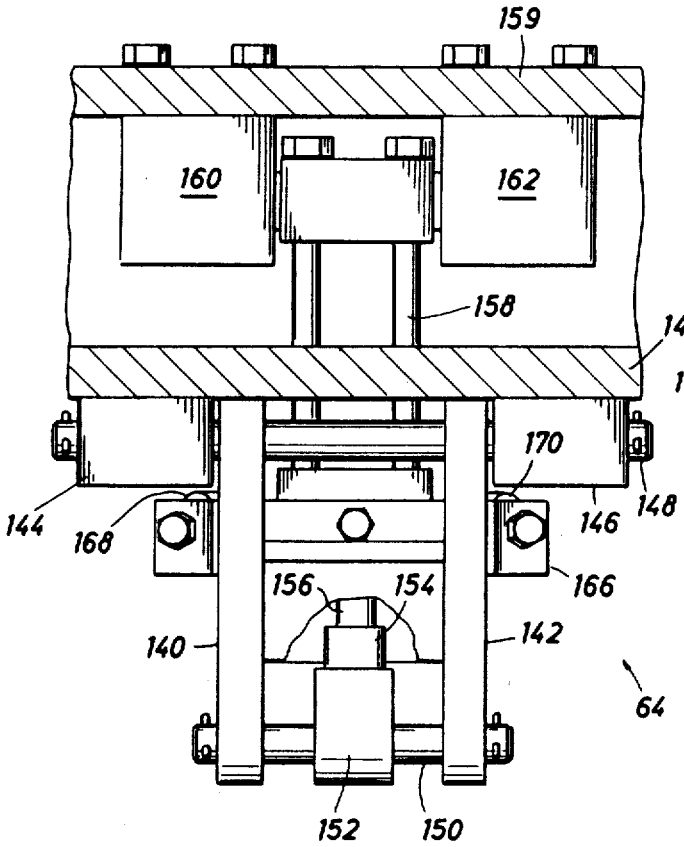
FIG. 7
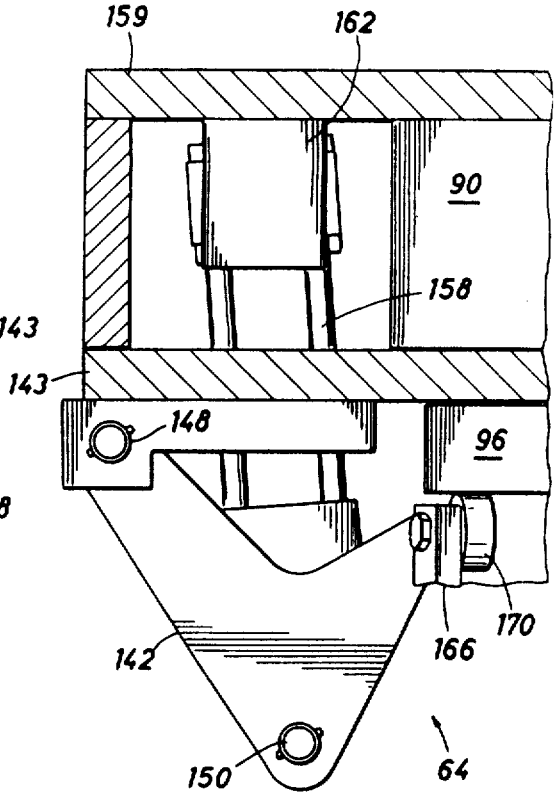
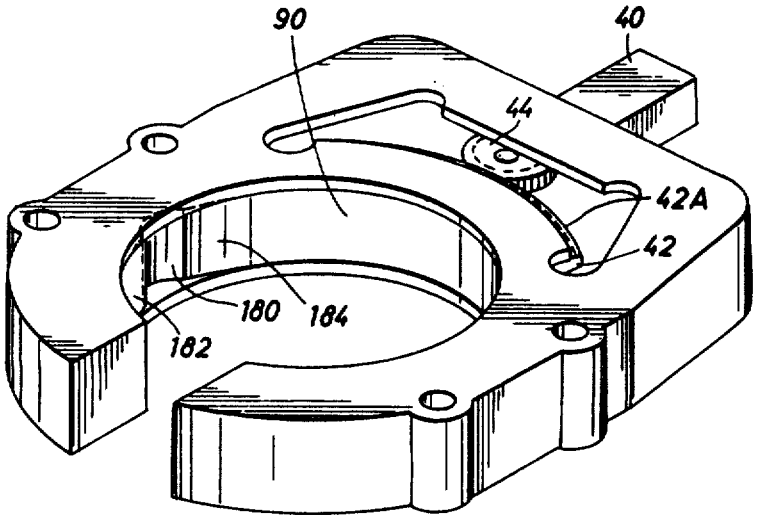
FIG. 8

BACK-UP POWER TONGS AND METHOD

Matter enclosed in heavy brackets [ ] appears in the original patent but forms no part of this reissue specification; matter printed in italics indicates the additions made by reissue.

BACKGROUND OF THE INVENTION

The present invention relates to a back-up power tong of the type commonly used in oil fields for use with an additional power tong in the making up and breaking out of threaded connections between drill pipes, casing, tubing, and the like.

The use of power tongs in making up or breaking out a drill string or casing section is well known and is now commonplace. Typically, when using such power tongs the conventional rig tongs are utilized to hold the lowermost section of the pipe joint being operated upon. However, only recently extremely high-torque power tongs have become available and, when applying such extremely high torques to a pipe joint or the like, the conventional rig tongs which are not powered are generally very large and cumbersome in order to be strong enough to withstand the high torques involved. Additionally, where a power back-up tong is to be utilized in a high-torque situation, it is desirable that the tongs be constructed in such a way that the power tongs may be placed on the pipe joint as close to the back-up tong as possible. This is especially true when operating with drill pipe, since only the pin and box are of special quality materials and it is at these surfaces that the heads of the two units must operate.

In utilizing a back-up tong with a power tong, it is also advantageous to ascertain the relative torque between the two units during the making up process, hence it is beneficial to provide the units with some degree of mutual freedom, so that a relative torque measurement may be made therebetween. Occasionally the situation arises in the drilling of a well that, during the makeup or breakout operation, the drill string is not held firmly by the collars or slips in the rotary table of the drilling platform and the drill string will therefore begin to slip down into the hole. If this occurs when using conventional back-up tongs, the tongs may be damaged severely since they will be pulled loose from the rig and smashed down against the drill platform floor.

SUMMARY OF THE INVENTION

The present invention provides back-up tongs employing sliding heads which are operated by specialized camming surfaces to provide a high-torque capability A motor, either electric, pneumatic, or hydraulic is provided to cause the back-up tongs to firmly grip the lowermost of the pipes at the joint. A removable cage plate is provided to carry the sliding heads, and the cage plate is constructed so as to provide a back-up tong wherein the sliding heads are as close to the top surface as possible, thereby permitting the power tongs and the back-up tongs to be positioned in close proximity to each other.

Hydraulically operated lever arms are employed at the bottom surface of the back-up tong to hold the cage plate in position in the main back-up tong body. The hydraulically operated hold-up arms have a preselected holding force such that if this force is exceeded, e.g., by the drill string slipping back down into the hole and tending to drag along the back-up tong and the power tongs with it, the preselected holding force will be exceeded and the hydraulic cylinders of the hold-up arms will then be released. In this manner the cage plate and sliding head assembly is permitted to separate from the body of the back-up tongs. This provides not only protection for the equipment but is also a safety feature for the personnel operating the back-up tongs. A motor or hydraulic cylinder is used to rotate the cage plate bearing the sliding heads relative to the specialized camming surface, thereby bringing the heads into contact with the pipe being held.

A crank operated backing pin assembly is provided which serves to locate a stop on the appropriate side of a backing lug so that after the sliding heads are rotated loose of the pipe, the cage plate assembly will rotate until it lines up with the opening in the tong and the tong may be taken off the pipe.

Accordingly, it is an object of the present invention to provide a back-up tong having sliding heads whereby a high torque may be provided to grasp a drill pipe or the like.

It is a further object of this invention to provide a back-up tong having a load cell so that the relative torque between the power tong and the back-up tong may be measured.

It is a further object of this invention to provide an improved method for measuring the torque being applied by a power tong to a drill pipe or the like.

It is another object of the present invention to provide a back-up tong having a releasable sliding head assembly such that the head assembly may be separated from the body of the back-up tong upon exceeding a predetermined force.

An additional object of the present invention is to provide apparatus for securing a tubular member and the like against axial rotation, comprising ring-like member fixedly positionable partially about said tubular member, at least one gripping member radially movable between said ring-like member and said tubular member, and driving means for arcuately moving said gripping member for wedgeable engagement between said ring-like member and said tubular member.

An additional object of the present invention is to provide a method for measuring torque being applied by a power tong to a rotatable portion of a tubular member or the like, comprising securing a back-up tong to a stationary portion of said tubular member preventing further arcuate rotation of said back-up tong, and inserting a force measuring device between a portion of said power tong and a portion of said back-up tong, and allowing said power tong to rotate in an arcuate path while turning said rotatable portion of said tubular member until said portion of said power tong comes into contact with said portion of said back-up tong.

The manner in which the present invention achieves these and other objects will become apparent from the following description of the preferred embodiments.

BRIEF DESCRIPTION OF THE DRAWINGS

FIG. 4 is a cross section of the back-up tongs shown in FIG. 2 taken along sight line 4—4;

FIG. 5 is an exploded perspective view of the cage plate assembly showing the inventive sliding heads of the back-up tongs;

FIG. 6 is a side elevation of a portion of the inventive back-up tong showing the cage plate hold-up assembly;

FIG. 7 is another side elevation showing the hold-up assembly of FIG. 6; and

FIG. 8 is a perspective view showing the camming surfaces of the inventive power back-up tong.

DETAILED DESCRIPTION OF THE PREFERRED EMBODIMENTS

Figure 1:
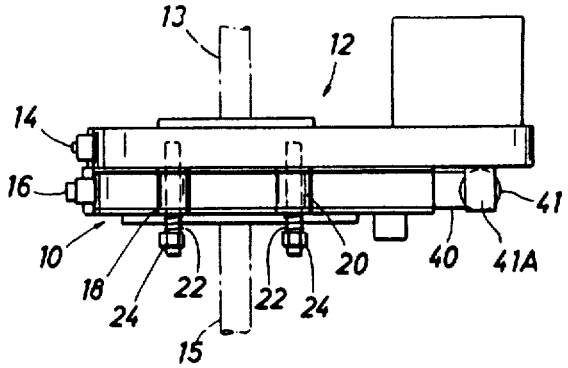
FIG. 1 is a perspective view of the inventive back-up tong mounted for cooperation with a power tong.

Referring now to FIG. 1, the inventive back-up tongs 10 are shown in a typical combination with power tongs 12. The throat of the tongs 12 is made accessible to a tubing, casing, or pipe 13 by opening doors 14. Likewise, the throat of the back-up tongs 10 is made accessible to a similar tubing, casing, or pipe 15 by opening doors 16. The back-up tongs and power tongs are coupled by means of four large posts, which are threaded into the body of the power tongs. Two of the posts are seen at 18 and 20 and the back-up tongs are retained on the posts by large springs 22 and nuts 24. The function and detailed construction of this coupling means will be shown in more detail hereinafter.

Figure 2:
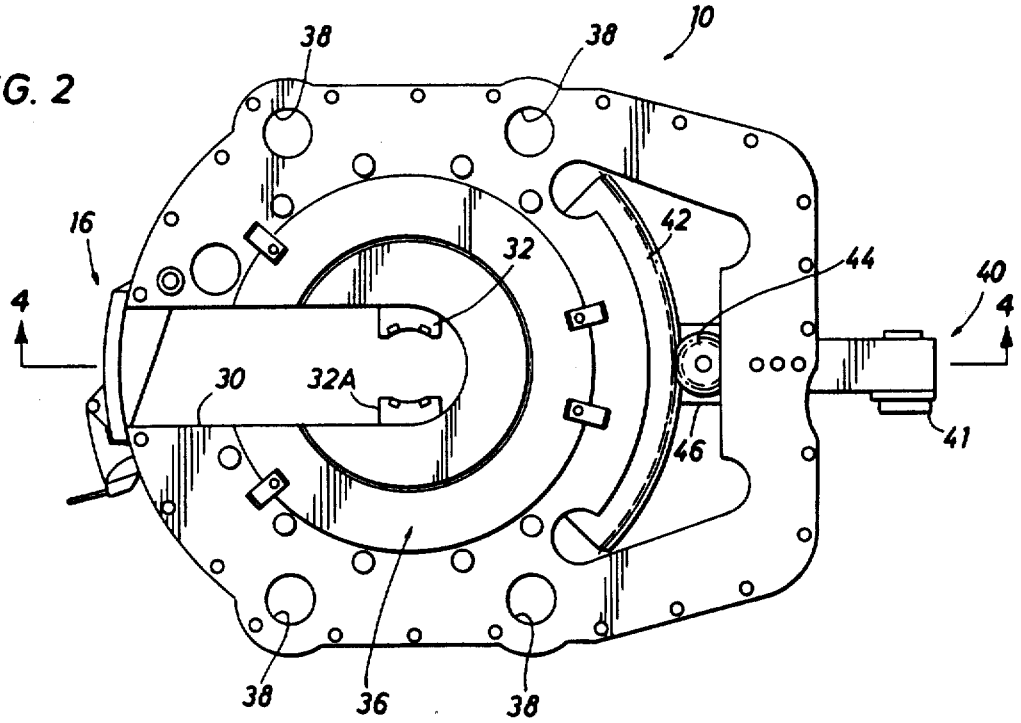
FIG. 2 is a top plan view of the inventive back-up tongs of FIG. 1.

FIG. 2 is a top plan view of the inventive back-up tongs 10 of FIG. 1. The door assembly 16 is the means for securing the throat or opening 30, which receives the pipe to be rotated. The two sliding heads 32 are suitably retained in a releasable cage plate assembly 36. The details of the cage plate assembly will be discussed in relation to a following drawing. The holes through which the four large posts (two of which were seen in FIG. 1 at 18 and 20) pass are shown typically at 38. These holes may be bored to a size which is larger in diameter than the outer diameter of the large posts 18 and 20, so as to permit a slight amount of movement between the back-up tongs and the main power tongs. The difference between the diameter of the posts and the holes should be such that when torque is applied to the power tong, the posts and the walls of the bored holes do not make sufficient contact so that torque is not applied to the back-up tong through the posts. Thus, an accurate torque measurement can be made between the power tong and the back-up tong by means of a load cell. In this regard, a stinger assembly 40 is mounted at the rear of the back-up tongs 10 which has a load cell 41 mounted thereon which cooperates with a box-like frame mounted on the main power tongs. The manner in which the back-up tongs stinger assembly 40 cooperates with the load cell 41 and the main power tongs to produce a torque measurement during a pipe joint make-up will be set forth in detail hereinbelow.

The cage plate assembly 36 is provided to cooperate and interact with specialized camming surfaces so that upon relative rotation therebetween the heads will be driven into the center of the throat thereby grasping the pipe to be held. In this regard, means are provided for a limited amount of mutual rotation between the cage plate assembly carrying the heads and the specialized camming surface which is used to drive the heads in the desired direction. More specifically, a gear segment 42 is provided which is attached to the specialized camming surface which may be designed in accordance with the "cam angle" technique, as described in U.S. Pat. No. 4,084,453. A pinion gear 44 is attached to a motor mount assembly 46 which is movable relative to the gear segment 42. The pinion gear 44 is driven by a motor, not shown in FIG. 2. Upon actuation of the motor the pinion gear 44 and the motor mount assembly 46 are driven around the gear segment 42, and the motor and gear 44 hence "walk around" the gear segment 42, dragging the cage plate assembly 36 along with them. In this embodiment, the motor drive system is a hydraulic system and the motor is chosen so that upon reaching a predetermined hydraulic pressure the motor rotation stops. It is understood, of course, that the motor may be driven by pneumatic pressure as well as by hydraulic pressure and a pressure stop would also function with a pneumatic system. Were the present invention to be embodied with an electric motor, a torque motor could be used and a current sensing device would serve to deactivate the driving motor upon firmly gripping the pipe. The manner in which the inventive sliding heads are relieved from contact with the pipe will be described in more detail hereinafter; however, the pressure stops built into the motor are also utilized in the operation in which the heads are retracted.

Additionally, in an alternate embodiment, a hydraulic or pneumatic cylinder system could be used to rotate the cage plate assembly, in place of the fluid motor, which is utilized in the embodiment shown in FIG. 2. In this alternate embodiment, the cylinder system could be used to directly rotate the cage plate assembly, and the gear segment 42 and pinion gear 44 may be eliminated.

Figure 3:
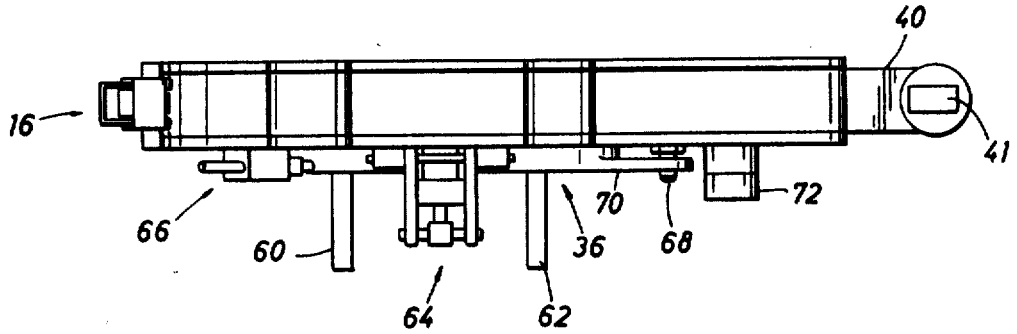
FIG. 3 is a side elevation view of the inventive back-up tongs.

FIG. 3 is a side elevation of the inventive back-up tongs. Four legs, attached to the cage plate assembly 36, are provided to support the back-up tongs on the rig floor during the head changing operation and also during the waiting period in between operations. Two of the four legs are shown at 60 and 62. Located between these two legs 60, 62 is one of the two hold-up assemblies 64 which hold the cage plate assembly 36 onto the body of the back-up tongs 10. Also shown in this view is the backing pin assembly 66 which provides a crank stop for cooperating with a backing lug mounted on the cage plate 36 which allows the cage plate assembly to be aligned with the opening 30 after the jaws are retracted from the pipe. FIG. 3 shows a locating pin 68 and a tab 70 having a suitable hole therein, which cooperate during the assembly of the cage plate assembly 36 with the main body of the back-up tong 10 after these units have been separated. The hydraulic motor 72 which drives the pinion gear 44 of FIG. 2 is attached to extension 46 at the rear of the back-up tongs 10.

Referring now to FIG. 4, which is a cross section taken along sight line 4—4 of FIG. 2, the specialized cam ring 90, bearing the camming surface on the inside and which serves to drive the heads, may be seen in cross section at 90. One of the two heads 32 and 32A is located in the throat 30 and has jaws 92 which are formed of hardened steel and have serrated surfaces. It is understood of course that the sliding jaws 32 and 32A are arranged to slide in channels or passageways formed in the cage plate assembly 36 and, as may be seen, the cage plate assembly 36 comprises a top cage plate 94 and a bottom cage plate 96 and has suitable grooves or channels milled therein so that a plurality of cam followers, shown typically at 98, may be used to take up lateral forces transmitted to the cage plate assembly 36.

The motor 72 drives the pinion gear 44 and it may be seen that pinion gear 44 interacts with the gear segment 42. A specialized mounting bracket 100 is provided to mount the motor 72. As described above, the motor mount assembly 46 includes the bracket 100 and the pinion gear 44 affixed thereto. Cap screw 102 is typical of the bolts used to attach the gear segment 42 to the top plate 104 of the back-up tongs. Rollers 103 are secured to the specialized bracket 100 and follow recesses in the groove segment 104 in order that the motor mount assembly 46 may rotate relative to the gear segment 42. The tab 70 and locating pin 68 may also be seen in FIG. 4. Cap screw 105, which is shown with a cam follower 98A at the head thereof similar to cam follower 98, is used to secure plate 107 to the specialized cam ring 90.

Referring now to FIG. 5, the cage plate assembly 36 and the inventive sliding heads 32 are shown in an exploded perspective view so that the workings of the cage plate assembly may be ascertained. In this regard, the cage plate assembly 36, as shown in FIG. 4, is formed of an upper cylindrical cage plate 94 and a lower circular cage plate 96 which are suitably fastened together, for example by bolt 124. In this manner, two guides or passageways are formed, shown typically at 110, wherein the sliding head assembly 32 is arranged to fit. Each sliding head assembly 32 is formed of a main head block 112 and a roller 114, which is rotatably fastened to the main head block 112 by means of a pin 116. One of the two hardened steel jaws 92 is shown in relation to the groove in main head block 112, wherein the jaw is to be pressed. Each head 32 is maintained in a withdrawn position in the cage plate assembly 36 by means of a spring 118 which cooperates with a pin 120 which is slip fitted into a bore 122 in the main head block 112. The other end of spring 118 may be suitably affixed to the top surface of the cage plate assembly 36, thereby maintaining the head 32 in a retracted position within the channels 110 of the cage plate assembly 36. The bore 122 is not made on the vertical but, rather, is at a small slant, e.g., 5°, so that the end of the pin 120 attached to the spring 118 is slightly closer to the steel jaws 92 than the other end of pin 120. The tension of spring 118 therefore keeps the pin 120 in the slot 122 and when the spring 118 is released, and the pin 120 will easily slip from the bore 122. A key 123 is provided to fit in an appropriate keyway formed in the plates 94 and 96 of the cage plate assembly 36 and aids in locking the assembly together. The manner in which the sliding heads 32 and the roller 114 interact with the cam ring 90 will be explained in more detail below.

Also shown in FIG. 5, is the backing lug 130 which is affixed by means of a fastener 132 onto the bottom of cage plate 96. As explained above, this backing lug 130 cooperates with the backing pin assembly 66 of FIG. 3 and serves to properly align the cage plate assembly with the opening 30 so that the tong may be taken off the pipe. Also seen in FIG. 5 is the tab 70 which interacts with the locating pin 68 so as to align the cage plate assembly 36 with the motor mount assembly 46 after the cage plate assembly has been separated from the back-up tongs.

Referring now to FIGS. 6 and 7, the inventive hold-up system 64 for releasably retaining the cage plate assembly 36 in the back-up tongs 10 is shown in more detail. The hold-up assembly 64 comprises L-shaped hold-up brackets 140 and 142 which are mounted on the bottom plate 143 of the back-up tongs by means of two pillow blocks 144 and 146 and a pillow block shaft 148. The pillow blocks 144 and 146 are suitably affixed to the bottom plate 143 and the bottommost portion of the cage plate hold-up brackets 140 and 142 is a hydraulic cylinder mounting shaft 150 which is attached by means of a block 152 to a cylinder stop collar 154, which is affixed to the shaft 156 of a hydraulic cylinder 158. The other end of the hydraulic cylinder 158 is affixed to the top plate 159 of the back-up tongs by means of two trunnion blocks 160 and 162. The cage plate hold-up brackets 140 and 142 are somewhat L-shaped and one arm thereof is affixed to the bottom plate of the inventive back-up tongs, and the other ends of the hold-up brackets 140 and 142 are provided with a support bracket 166 which has bolted thereto cam followers or the like, two of which may be seen at 168 and 170. It is these cam followers 168 and 170 which bear against the bottom surface of the bottom cage plate 96 and support its weight in cooperation with the hydraulic cylinder 158. Although two hold-up brackets 140 and 142 are shown in FIG. 6, it is apparent that any number of hold-up brackets may be used, although a single bracket may not be desirable for adequately supporting the cage plate assembly 36. The operation of this inventive hold-up system will be explained in detail hereinafter.

The operation of the inventive back-up tongs will be described based on the preceding figures, as well as additional FIGS. 8–10. When it is desired to make up or break out a pipe joint or casing joint employing the inventive back-up tongs in combination with a power tong unit, the units are typically suspended from the top of the drill rig by a chain or line so that the units may then be swung into place. The back-up tongs must then be clamped onto the lower of the two pipes, after the pipe has been placed into the throat 30 and the door assembly 16 has been securely fastened. Thereafter, the motor 72 is actuated causing the pinion gear 44 to walk around the gear segment 42, thereby driving the cage plate assembly in a rotary motion relative to the pipe segment and to the cam ring 90, such that the heads 32 and the head rollers 114 are driven out of a neutral cam position 180 and into engagement with the camming surfaces 182 or 184. It is understood that similar second camming surfaces, which may be seen in FIGS. 9 and 10, located on the opposite side of the cam ring 90 for driving in one of the heads 32. These camming surfaces 182 and 184 may be designed based on the "cam angle" technique, as described in U.S. Pat. No. 4,084,453. The camming surfaces enable the heads 32 and 32A to sufficiently bite the casing so that the casing will not slip relative to the back-up tong when a high torque is applied by the power tong.

Figure 9:
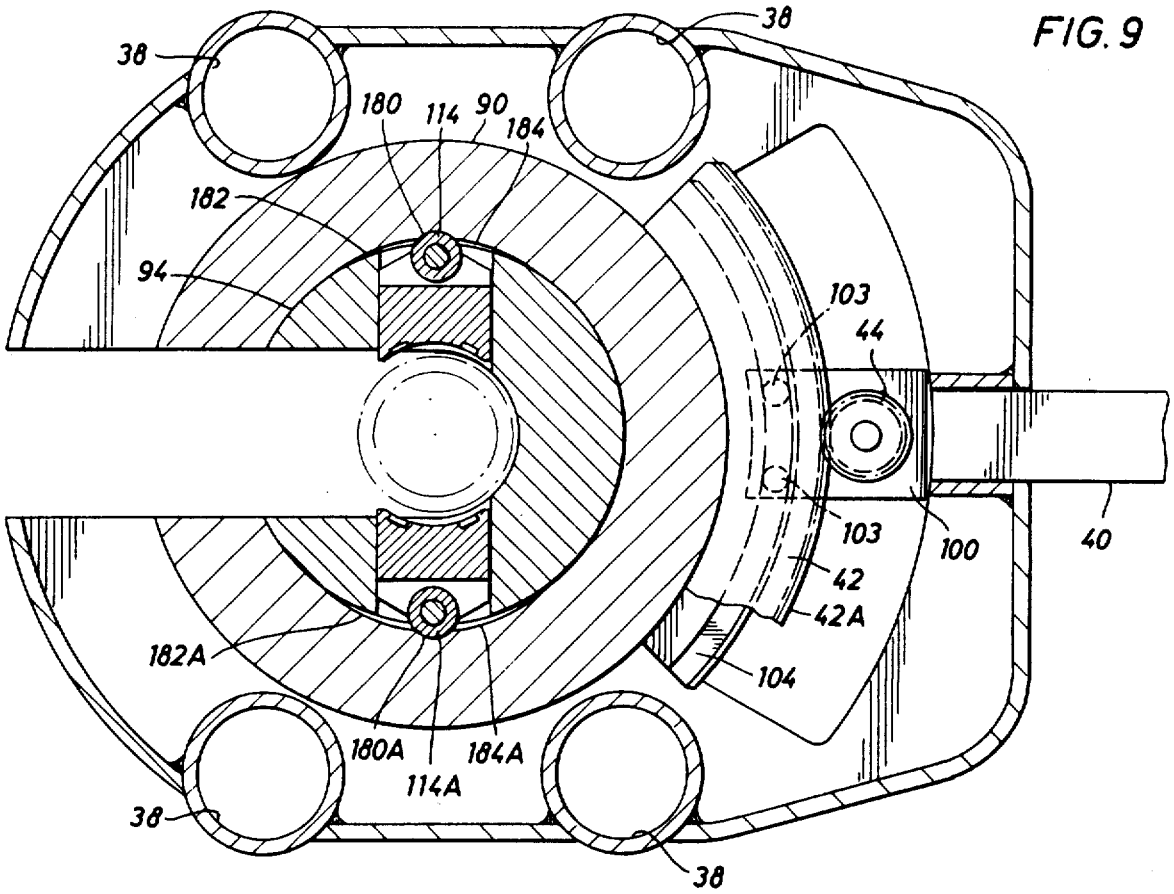
FIG. 9 is a simplified pictorial view, partly in cross section, of the components radially gripping the pipe member, when such components are relaxed.

As shown in FIG. 9, the rollers 114 and 114A are in their respective neutral cam positions 180 and 180A. The sliding heads 32 and 32A are therefore not in contact with the pipe casing and the back-up tong may be stated to be in the neutral position.

Figure 10:
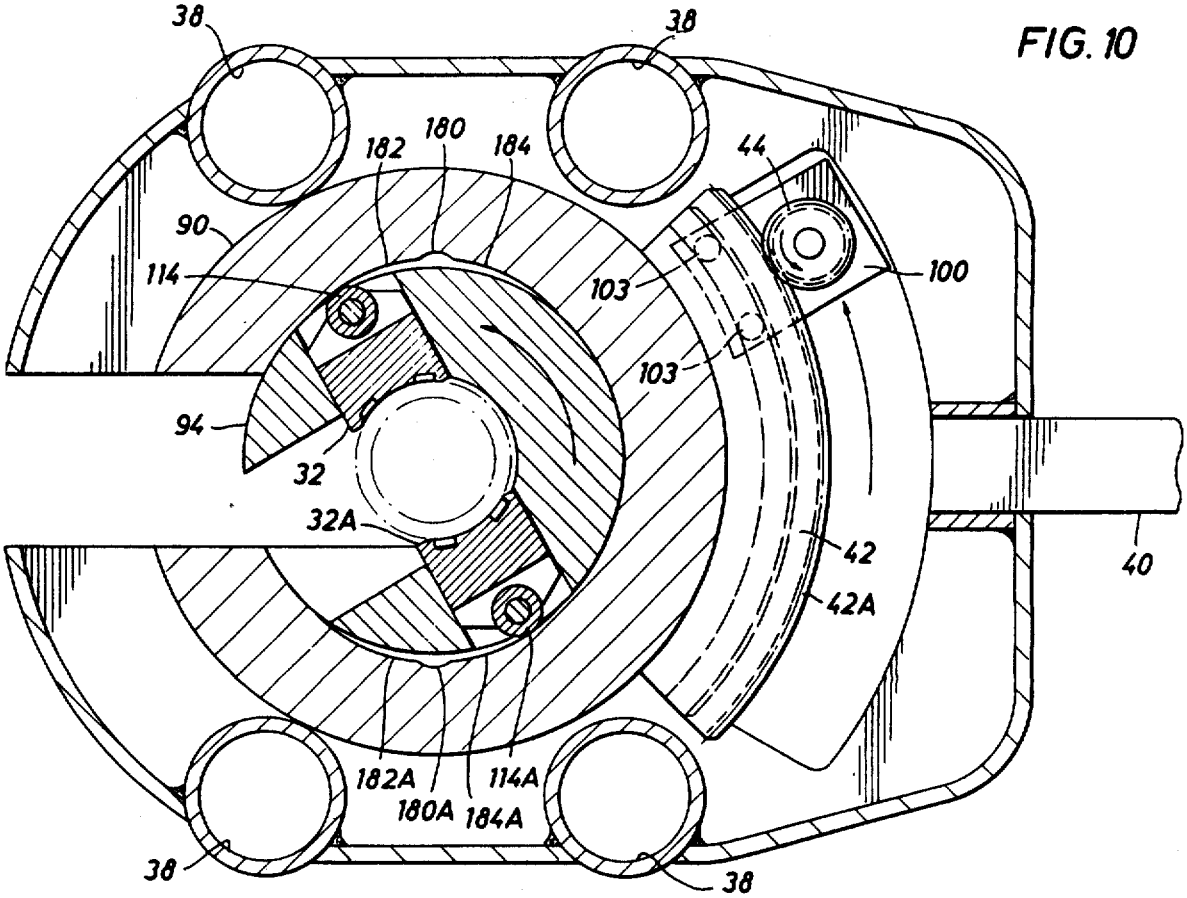
FIG. 10 is a simplified pictorial view, partly in cross section, of the components depicted in FIG. 9 when engaging the pipe member.

In FIG. 10, the motor 72 has been activated causing the pinion gear 44 to walk around the gear segment 42. This, in turn, causes the heads 32 and 32A to rotate in the counterclockwise direction and the rollers 114 and 114A ride up the cam surfaces 182 and 184A respectively. As shown in FIG. 10, the rollers are shown at the extreme end of the cam surfaces, which is most likely to occur if the casing is undersized. Since the rollers have moved up the cam surfaces, the heads 32 and 32A are pushed radially into the casing and the back-up tong is securely attached to the casing. As shown in FIG. 10, the position of the dies are such that the back-up tong is in a position for disconnecting joints of pipe. If pipe is to be secured together, the rollers 114 and 114A would be rotated to engage the cam surfaces 182A and 184, respectively.

Because the motor 72 is provided with a pressure release, upon firmly gripping the pipe the pressure in the motor builds up and the motor will then deactivate itself. At such time the power tongs being used in conjunction with the back-up tongs then grip and rotate the topmost pipe in the desired manner. If it is a make up operation, the stinger assembly 40 bearing the pressure cell 41 may then interact with the box-like portion on the power tongs and the torque gauge mounted on the power tongs will indicate the pressure at which the make up operation is completed. A reading of this make up torque indicates to the operator that sufficient torque has been applied to insure that the threaded connection has properly been made, and that an excessive torque has not been applied which may damage the connection. Further, the torque reading as described herein is more accurate than a pressure gauge attached to a snub line on the power tong, since the torque reading from the pressure gauge on the snub line will vary depending on the particular point where the snub line is secured.

In other words, as shown in FIG. 1, the power tong in the instant invention has an arm 41A which acts against the load cell 41 to produce a torque measurement. Since the location of the load cell is fixed relative to the back-up tong and the arm 41A is fixed relative to the power tong, a force measurement on the load cell 41A will result in an accurate torque measurement. If the torque developed by the power tong is measured by a pressure gauge secured to a snub line, the angle formed by the snub line relative to the power tong will affect the reading on the pressure gauge in the snub line. In the break out operation, it is to be understood that the torque reading may not be necessary. In the embodiment shown in FIG. 1, the arm 41A would move away from the load cell 41 during the break out operation. Movement between the power tong and the back-up tong is limited, however, since the posts 60, 62 soon come into contact with the walls of the boreholes 38.

At the conclusion of the make up or break out operation, the heads must be removed from the lowermost pipe. In order to accomplish this, the motor 74 is then driven in the reverse direction and the heads 32 disengage the pipe. The motor continues to rotate in the reverse direction until the backing lug 130 contacts the backing pin assembly 66. At the conclusion of this operation, with the heads 32 being retracted by action of the springs 118, the motor will once again stop since it has reached the preselected maximum fluid pressure, due to the interaction between the backing lug 130 and the backing pin assembly 66. At this time, of course, the cage plate assembly 36 and the cam ring 90 have their openings aligned at the throat 30, thereby permitting disengagement of the back-up tong from the pipe.

The manner in which the sliding heads 32 may be changed in the inventive back-up tongs will now be described. It is understood of course, that changes of the sliding heads may be necessitated first by routine maintenance or secondly in the case that the back-up tongs are to be used with a pipe or casing of a different size thereby necessitating the use of a different set of heads which correspond to the outer diameter of the pipe to be grasped. It is understood that when gripping smaller diameter pipe, the heads are larger and vice versa. In performing such operation the back-up tongs may be set on the rig floor so that they are resting upon the four legs 60, 62 which are attached to the cage plate assembly 36. While the back-up tongs are now resting on these legs 60, 62 the hydraulic circuit may be operated to release the hydraulic cylinder 158 in the hold-up assembly 64, thereby permitting the hold-up brackets 140, 142 to move in a downward direction, thereby releasing the cage plate assembly 36. At that time, the body of the back-up tongs may be lifted upwards leaving the cage plate assembly 36 remaining on the rig floor supported by the four legs 60, 62. Springs 118 may then be released thereby freeing pins 120 and permitting them to be removed from bores 122. The inventive heads are slid back out of the cage plate and the new heads inserted. The back-up tong body is lowered back down over the cage plate assembly 36, which is resting on the rig floor on the four legs 60, 62. During this reassembly operation care must be taken to make sure that the lug 70 having the hole therein is correctly positioned such that the pin 68 be aligned therein. The hydraulic circuit is now actuated to drive the hydraulic cylinders 158, so that the hold-up assembly 64 is driven upwardly, thereby causing the cam followers 168 and 170 to abut the lower surface 96 of the cage plate assembly 36. At that time, the back-up tongs are then once again ready for use.

It is understood of course that the foregoing discussion is intended by way of example only and is not intended to limit the scope of the present invention except as set forth in the appended claims.

What is claimed is:

1. Back-up apparatus for securing a first portion of a tubular member against axial rotation in response to rotation of another portion thereof by a pipe-rotating device and the like, comprising

*a* frame member having a generally annular configuration and a first *open* throat portion for receiving said first portion of said tubular member, a ring-like member [fixedly interconnected within] *affixed to* said frame member and having *camming surfaces and* a corresponding second open throat portion for receiving said first portion of said tubular member in cooperation with said frame member, a plurality of spaced-apart gripping members [radially] movable between said ring-like member and said first portion of said tubular member, a rotatable cage plate assembly positioned within said ring-like member and having a third open throat portion for receiving said first portion of said tubular member when rotatably aligned with said first and second open throat portions and for carrying said plurality of spaced-apart gripping members, stop means on said rotatable cage plate assembly for aligning said third open throat portion of said rotatable cage plate assembly with said first and second open throat portions, and driving means for arcuately moving said cage plate assembly with respect to said ring-like member and for thereby bringing said gripping members into wedgeable engagement between said ring-like member and said first portion of said tubular member.

2. The back-up apparatus described in claim 1, further comprising support means for releasably retaining said cage plate assembly within said frame member, and actuation means for deactivating said support means and for thereby releasing said cage plate assembly from said ring-like member.

3. The back-up apparatus described in claim 2, wherein said ring-like member comprises a partial ring having a first eccentrically arcuate interior *camming* surface portion for receiving and wedging a first one of said gripping members [radially] against said first portion of said tubular member and a second eccentrically arcuate interior *camming* surface portion spaced approximately 180° opposite from said first surface portion for receiving and wedging a second one of said gripping members [radially] against said first portion of said tubular member and in opposition to said first gripping member upon rotation of said cage plate assembly by said driving means[, and ]

[linking means for interconnecting said partial ring means and said driving means].

4. The apparatus described in claim 3, wherein said actuation means releases said cage plate assembly and gripping members from said partial ring in response to an axially directed force exerted on said support means.

5. The apparatus of claim 2, wherein said driving means for effecting mutual rotary motion between said cage plate assembly and said ring-like member comprises a gear segment affixed to said frame *member*, and a pinion gear connected to an extension of said cage plate assembly and arranged to cooperate with said gear segment for rotary movement of said cage plate assembly relative to said [cam ring] *ring-like member*.

6. The apparatus of claim 2, wherein said support means comprises a pair of hold-up brackets each rotatably mounted relative to said frame member for retaining said cage plate assembly within said ring-like member, and

*said actuation means comprises* a hydraulic cylinder for causing rotational movement of said hold-up brackets to release said cage plate assembly from said ring-like member.

7. A back-up power tong for preventing a pipe from rotating, comprising a cam ring [affixed to] *connected with* a frame of said tong and having an opening therein so that said pipe may be laterally positioned within said cam ring and having [first and second] *one or more* camming surfaces on said cam ring, a cage plate assembly rotatable within said cam ring and having an opening therein so that said pipe may be laterally positioned [in] *within* said cage plate assembly,

[first and second] *one or more* pipe gripping heads mounted within said cage plate assembly, means for effecting rotary motion between said cage plate assembly and said cam ring, means affixed to said [first and second] *one or more* pipe gripping heads for cooperating with said camming surfaces such that, upon rotary motion between said cage plate assembly and said cam ring, said [first and second] *one or more* pipe gripping heads are caused by said camming surfaces to move inwardly thereby gripping said pipe, [and]

[support means for releasably retaining said cage plate assembly within said cam ring, including (a) at least two hold-up brackets each rotatably mounted relative to said frame, and (b) a fluid-powered cylinder for causing rotational movement of said hold-up brackets.]

*support means for releasably retaining said cage plate assembly within said frame, and*

*actuating means for deactivating said support means and for thereby releasing said cage plate assembly from said frame.*

8. A back-up power tong for preventing rotation of a pipe by gripping said pipe during the make up or break out of a threaded joint comprising[:]

a frame having a first open throat for receiving said pipe to be gripped, a cam ring affixed to said frame and having a second open throat for arranging said pipe within said cam ring having two camming surfaces disposed upon the inner [diameter] *circumference* of said cam ring, a cage plate assembly rotatably arranged within said cam ring and having a third open throat therein to receive said pipe to be gripped and having two passageways therein each located opposite a different one of said camming surfaces and arranged radially with respect to said pipe, two pipe gripping head means each located in a different one of said passageways and arranged to slide within said passageways, means for effecting rotation between said cage plate assembly and said cam ring, support means for releasably retaining said cage plate assembly in said frame, and actuating means for deactivating said support means and for thereby releasing said cage plate assembly from said frame.

9. The apparatus of claim 8, wherein said support means comprises at least two hold-up brackets each rotatably mounted relative to said frame, and

*said actuation means comprises* a fluid-powered cylinder for causing rotational movement of said hold-up brackets to release said cage plate assembly from said cam ring.

10. The apparatus of claim 8, wherein said actuating means is responsive to an axial force exerted on said support means.

[11. The apparatus of claim 10, further comprising overload means responsive to said axial force exerted on said support means for releasing said cage plate assembly in response to a preselected axial force exerted on said cage plate assembly.]

12. The apparatus of claim 3 or 6, wherein said actuation means deactivates said support means to release said cage plate assembly in response to an axial force of a preselected magnitude exerted on said support means.

13. A back-up power tong for preventing a pipe from rotating of the type having a frame with a throat for receiving a pipe, comprising a cam ring affixed to said frame and having an opening so that said pipe may be positioned within said cam ring and having first and second camming surfaces on said cam ring, a cage plate assembly rotatable within said cam ring and having an opening therein so that said pipe may be positioned in said cage plate assembly, means for releasably retaining said cage plate assembly within said cam ring, first and second pipe gripping heads mounted within said cage plate assembly, means for effecting rotary motion between said cage plate assembly and said cam ring such that said first and second pipe gripping heads are caused by said camming surfaces to move inwardly thereby gripping said pipe, a locating pin affixed to said means for effecting mutual rotation, and said cage plate assembly including (a) an upper circular portion, (b) a lower circular portion, (c) a passageway formed in said upper and lower portions for receiving each of said pipe gripping heads, and (d) tab means affixed to said lower circular portion and having an aperture therein for receiving said locating pin to properly align said cage plate assembly during assembly with said cam ring.

*14. The apparatus of claim 1, wherein said frame member includes a plurality of apertures for receiving leg members affixed to said pipe-rotating device.*

*15. The apparatus of claim 7, wherein*

*said support means comprises at least two hold-up brackets each rotatably mounted relative to said frame, and*

*said actuation means comprises a fluid-powered cylinder for causing rotational movement of said hold-up brackets to release said cage plate assembly from said cam ring.*

*16. The apparatus of claim 7, wherein said actuating means is responsive to an axial force exerted on said support means.*

* * * * *